United States Patent
Matsushima

(10) Patent No.: US 10,286,819 B2
(45) Date of Patent: May 14, 2019

(54) VEHICLE INTERIOR STRUCTURE

(71) Applicant: TOYOTA BOSHOKU KABUSHIKI KAISHA, Aichi-ken (JP)

(72) Inventor: Iwao Matsushima, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 38 days.

(21) Appl. No.: 15/627,893

(22) Filed: Jun. 20, 2017

(65) Prior Publication Data

US 2017/0368976 A1 Dec. 28, 2017

(30) Foreign Application Priority Data

Jun. 27, 2016 (JP) ................. 2016-127017

(51) Int. Cl.
| | | |
|---|---|---|
| *B60N 2/68* | (2006.01) | |
| *B60N 2/01* | (2006.01) | |
| *B60R 22/26* | (2006.01) | |
| *B60N 2/90* | (2018.01) | |
| *B60N 2/005* | (2006.01) | |
| *B60R 22/18* | (2006.01) | |

(52) U.S. Cl.
CPC ............ *B60N 2/688* (2013.01); *B60N 2/01* (2013.01); *B60N 2/91* (2018.02); *B60R 22/26* (2013.01); *B60N 2/005* (2013.01); *B60N 2/68* (2013.01); *B60R 2022/1818* (2013.01); *B60R 2022/266* (2013.01)

(58) Field of Classification Search
CPC . B60N 2/688; B60N 2/91; B60N 2/01; B60N 2/005; B60N 2/68; B60R 2022/1818; B60R 2022/266; B60R 22/26
See application file for complete search history.

(56) References Cited

U.S. PATENT DOCUMENTS

| | | | | |
|---|---|---|---|---|
| 5,567,017 A | * | 10/1996 | Bourgeois | A47C 7/40 297/228.13 |
| 6,533,341 B2 | * | 3/2003 | Marinelli | B60N 2/2245 296/65.16 |
| 6,726,287 B1 | * | 4/2004 | Janz | B60N 2/688 297/216.13 |
| 8,246,077 B2 | * | 8/2012 | Nezaki | B60N 2/688 280/733 |
| 8,251,429 B2 | * | 8/2012 | Lindsay | B60N 2/366 280/808 |
| 8,833,849 B2 | * | 9/2014 | Ishimoto | B60N 2/68 297/216.1 |

FOREIGN PATENT DOCUMENTS

JP 6-233714 8/1994

* cited by examiner

*Primary Examiner* — Philip F Gabler

(74) *Attorney, Agent, or Firm* — Greenblum & Bernstein, P.L.C.

(57) ABSTRACT

A vehicle interior structure including: a first structure; a second structure disposed adjacent to the first structure; and another member disposed on a design surface side of at least one of the first structure and the second structure, wherein a falling restriction part configured to restrict the other member from falling into a gap between the first structure and the second structure is provided to at least one of the first structure and the second structure.

8 Claims, 9 Drawing Sheets

VEHICLE INTERIOR STRUCTURE

CROSS-REFERENCE TO RELATED APPLICATIONS

This application claims priority from Japanese Patent Application No. 2016-127017 filed on Jun. 27, 2016, the entire contents of which are incorporated herein by reference.

TECHNICAL FIELD

The disclosure relates to a vehicle interior structure which includes a first structure, a second structure adjacent to the first structure, and another member disposed on a design surface side of at least one of the first structure and the second structure.

BACKGROUND

A bench-seat type vehicle seat is known as this kind of vehicle interior structure (see JP-A-H06-233714). In this vehicle seat, one-person seat and two-person seat are arranged side by side without a gap therebetween. Further, the one-person seat includes a narrow seat back corresponding to the first structure of the disclosure, and the two-person seat includes a wide seat back corresponding to the second structure of the disclosure. In addition, a band-like seat belt extending in an upper and lower direction is arranged between the seat backs adjacent to each other. This seat belt is a member corresponding to another member of the disclosure and can restrain an occupant on the one-person seat, for example. Further, since a moderate tension is applied to the seat belt, the seat belt is arranged to be pressed against the front side of the seat back when an occupant is not seated.

In the known technology, the seat belt is pressed against the front side of the seat back when an occupant is not seated, and, at this time, the seat belt often excessively falls into the gap between the seat backs adjacent to each other. Then, when an occupant is seated, since the seat belt needs to be pulled out from the gap, the usability is somewhat inferior.

SUMMARY

The disclosure has been made in view of the above situations and an object to be achieved by the disclosure is to prevent another member from excessively falling into the gap between the first structure and the second structure as much as possible.

According to an aspect of the disclosure, there is provided a vehicle interior structure including: a first structure; a second structure disposed adjacent to the first structure; and another member disposed on a design surface side of at least one of the first structure and the second structure, wherein a falling restriction part configured to restrict the other member from failing into a gap between the first structure and the second structure is provided to at least one of the first structure and the second structure.

Accordingly, the unintended movement of the other member is restricted by the falling restriction part. Therefore, it is possible to prevent the other member from excessively falling into the gap between the first structure and the second structure as much as possible.

DETAILED DESCRIPTION

Figure 1:
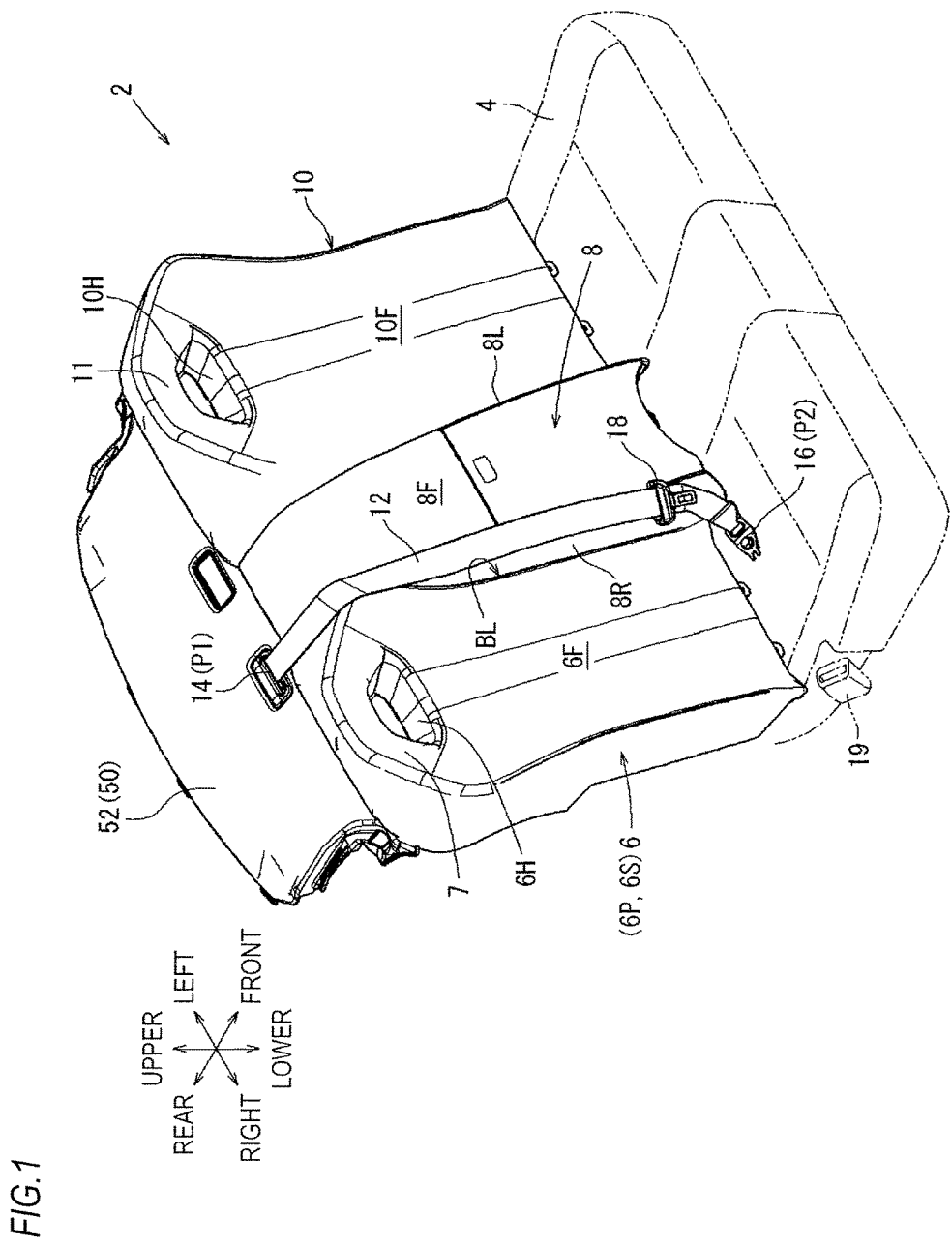
FIG. 1 is a perspective view of a vehicle seat.

Hereinafter, an embodiment for carrying out the disclosure will be described with reference to FIGS. 1 to 9. For convenience, arrows indicating a front and rear direction, a left and right direction and an upper and lower direction of a vehicle seat are appropriately shown in respective drawings. A vehicle seat 2 in FIG. 1 is a bench seat corresponding to the vehicle interior structure of the disclosure. The vehicle seat 2 includes a wide seat cushion 4, a first structure 6, a second structure 8, and a third structure 10 (details of each structure will be described later as appropriate). Further, the vehicle seat 2 is disposed in front of a panel body 50 partitioning a vehicle interior and a trunk room. By referring to FIG. 4, the panel body 50 is configured by a first panel part 51 and a second panel part 52. The first panel part 51 is a wall body standing in a state of being inclined rearward from a vehicle floor surface FL. The second panel part 52 is a substantially flat wall body extending rearward from an upper end of the first panel part 51.

Here, by referring to FIG. 1, all of the first structure 6, the second structure 8 and the third structure 10 are in a state of being erected from a rear portion of the seat cushion 4 and are arranged adjacently from the right to the left in this order. The first structure 6 is a member that functions as a seat back capable of supporting an occupant's back. The first structure 6 is disposed on the right side of the vehicle seat 2. On the upper portion of the first structure 6, a substantially inverted U-shaped headrest part 7 for supporting an occupant's head part and a substantially semicircular hole part 6H opened on the front surface below the headrest part are provided. Further, the third structure 10 is a member having substantially the same configuration as the first structure 6. The third structure 10 is disposed on the left side of the vehicle seat 2 with the second structure 8 interposed therebetween. Similar to the first structure 6, a headrest part 11 and a hole part 10H are also provided to the upper portion of the third structure 10.

Then, by referring to FIG. 1, the second structure 8 is a member for partitioning the first structure 6 and the third structure 10 and is disposed at the center of the vehicle seat 2 in a seat width direction. The second structure 8 is a member that functions as a center seat disposed between the first structure 6 and the third structure 10. The second structure 8 gradually protrudes forward from the first structure 6 and the third structure 10 from the upper side toward the lower side. Therefore, by referring to FIG. 2, a left surface 6L of the first structure 6 is hidden behind a rear portion of a right surface 8R of the second structure 8 adjacent thereto and thus is not exposed to the outside. In the present embodiment, the left surface 6L of the first structure 6 corresponds to the first surface different from the design surface of the first structure of the disclosure, and the rear portion of the right surface 8R of the second structure 8 corresponds to the second surface different from the design surface of the second structure of the disclosure. Further, a boundary line BL serving as a gap is formed between the first structure 6 and the second structure 8. The boundary line BL extends in the upper and lower direction of the seat. Meanwhile, a right surface (not shown) of the third structure 10 is hidden behind a left surface 8L of the second structure 8 adjacent thereto and thus is not exposed to the outside. Then, by referring to FIG. 1, a front surface 6F of the first structure 6, a front surface 8F of the second structure 8 and a front surface 10F of the third structure 10 are exposed to the outside to configure the design surface of the seat.

Then, by referring to FIGS. 1 and 2, a seat belt 12 (to be described later) extending in the upper and lower direction of the seat is disposed on the front surface 6F of the first structure 6 configuring the design surface. Similarly, a seat belt may be disposed on the third structure 10. However, in the present embodiment, for convenience, the seat belt 12 is disposed only on the first structure 6. The seat belt 12 is a member for restraining an occupant on the first structure 6. When an occupant is not seated, the seat belt 12 extends in the upper and lower direction of the seat on the left side of the first structure 6. Further, the boundary line BL serving as the gap between the first structure 6 and the second structure 8 is disposed behind the seat belt 12. In the configuration of this type of seat, there is a concern that the seat belt 12 to be disposed on the front surface 6F of the first structure 6 is excessively fallen into the boundary line BL serving as the gap between the first structure 6 and the second structure 8. Therefore, in the present embodiment, a falling restriction part 30 (to be described later) prevents, as far as possible, the seat belt 12 from falling into the gap between the first structure 6 and the second structure 8. Each configuration will be described in detail below.

[Seat Belt (Example of Another Member)]

Figure 4:
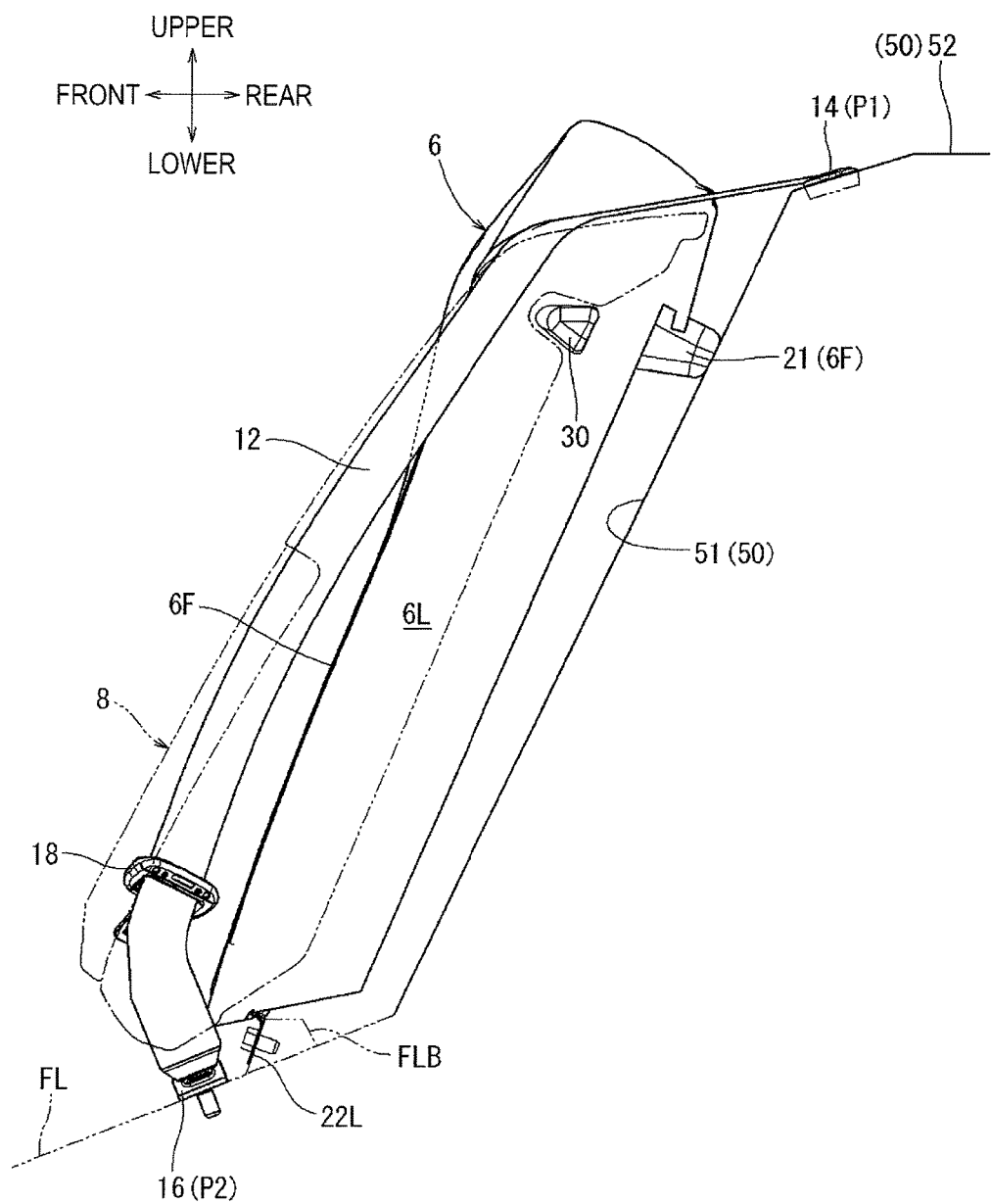
FIG. 4 is a side view of a first structure and a part of a panel body.

Here, by referring to FIGS. 1 and 4, the seat belt 12 is a band-like member extending in the upper and lower direction of the seat. An upper end of the seat belt 12 is disposed at an outlet 14 provided in the first panel part 51. By referring to FIG. 4, the outlet 14 is provided to the left and rear of the first structure 6. A retractor (not shown) capable of winding up the seat belt 12 is installed inside the outlet 14. Further, a fixed piece 16 is attached to a lower end of the seat belt 12. The fixed piece 16 is fastened and fixed to the vehicle floor surface FL. The fixed piece 16 in this fixed state is disposed in front of the outlet 14 and behind the front surface 6F. Here, an arrangement position P1 of the outlet 14 corresponds to the arrangement position of the other end (upper end in FIG. 4) of the other member in the disclosure, and an arrangement position P2 of the fixed piece 16 corresponds to the arrangement position of one end (lower end in FIG. 4) of the other member in the disclosure.

Then, when an occupant is seated, the seat belt 12 is wound around the occupant on the seat and a tongue member 18 provided in the middle of the seat belt 12 is locked to a buckle member 19 on the right side of the seat cushion 4 shown in FIG. 1. Further, when an occupant is not seated, the locking between the tongue member 18 and the buckle member 19 is released, and the seat belt 12 is drawn into the outlet 14 and is gradually arranged linearly in the upper and lower direction of the seat. At this time, the seat belt 12 comes into a state where a tension is applied toward the rear side that is a failing direction. In particular, the tension applied gradually increases from the lower end side toward the upper end side of the seat belt 12. That is, by referring to FIG. 4, the arrangement position P1 of the outlet 14 is located farther from the front surface 6F of the first structure 6 than the arrangement position P2 of the fixed piece 16. Therefore, a relatively strong tension is applied to the upper end side of the seat belt 12. In particular, a strong tension is applied to the portion of the seat belt disposed near a shoulder portion of the first structure 6.

(First Structure)

Figure 5:
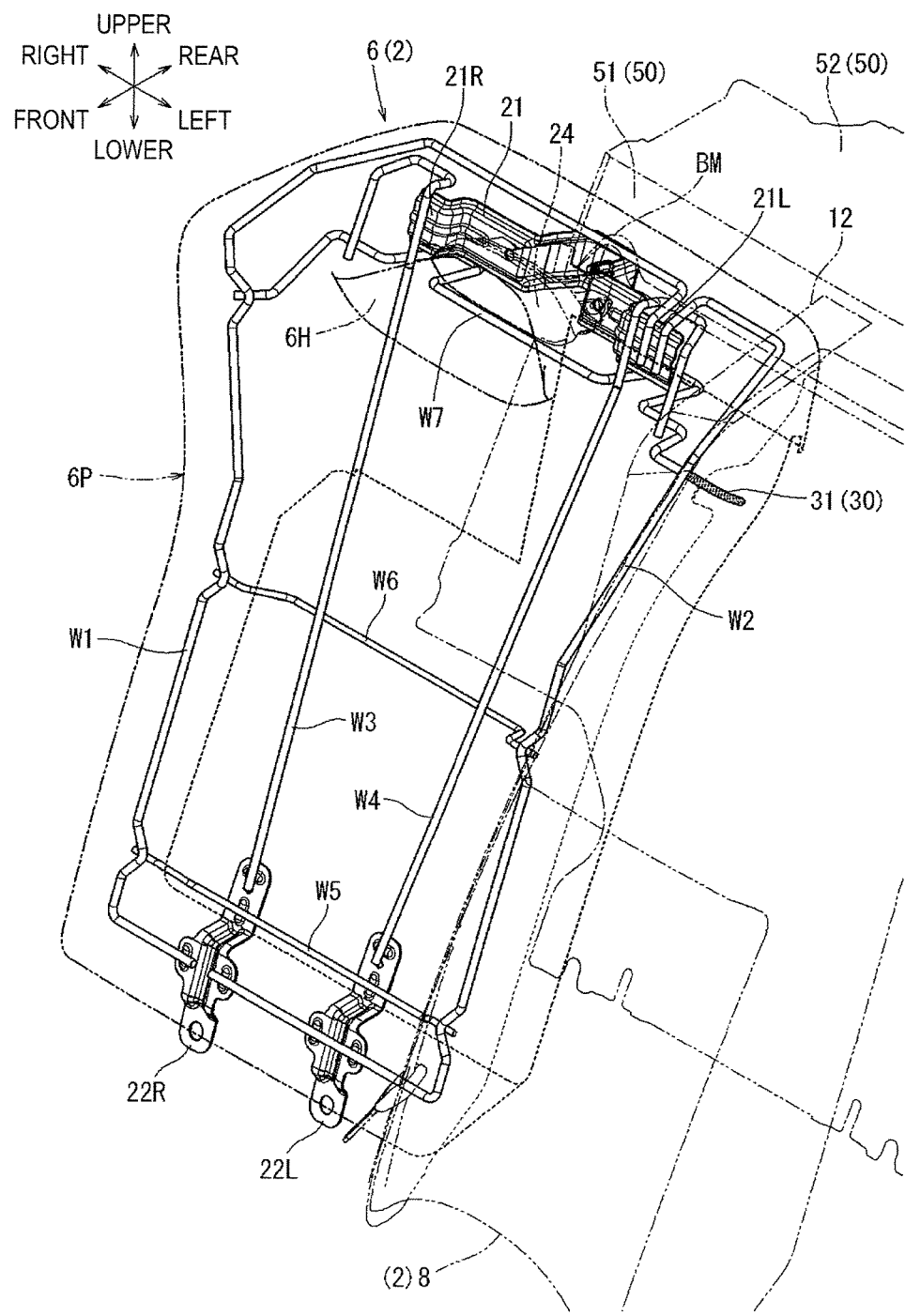
FIG. 5 is a perspective view of a seat frame.
Figure 8:
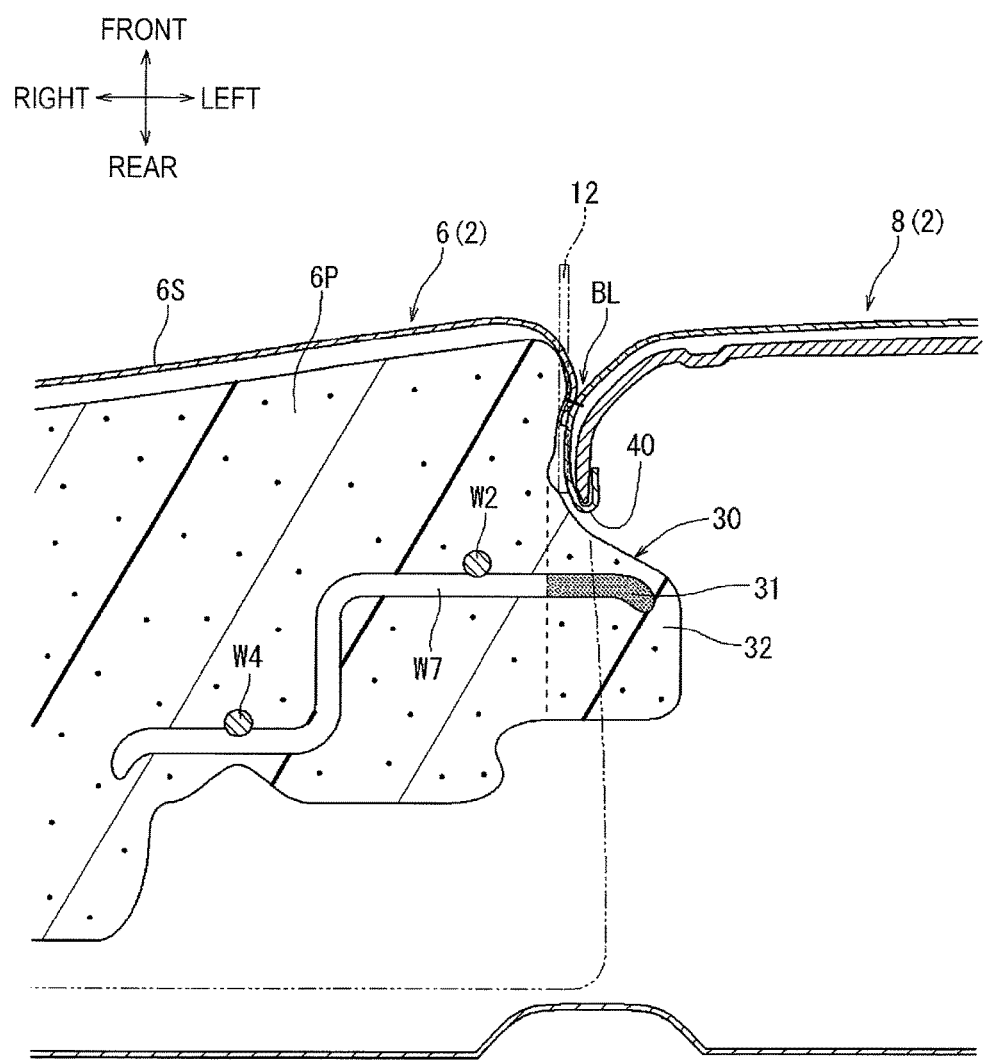
FIG. 8 is a sectional view of the vehicle seat corresponding to the section taken along the line VIII-VIII in FIG. 3.
Figure 9:
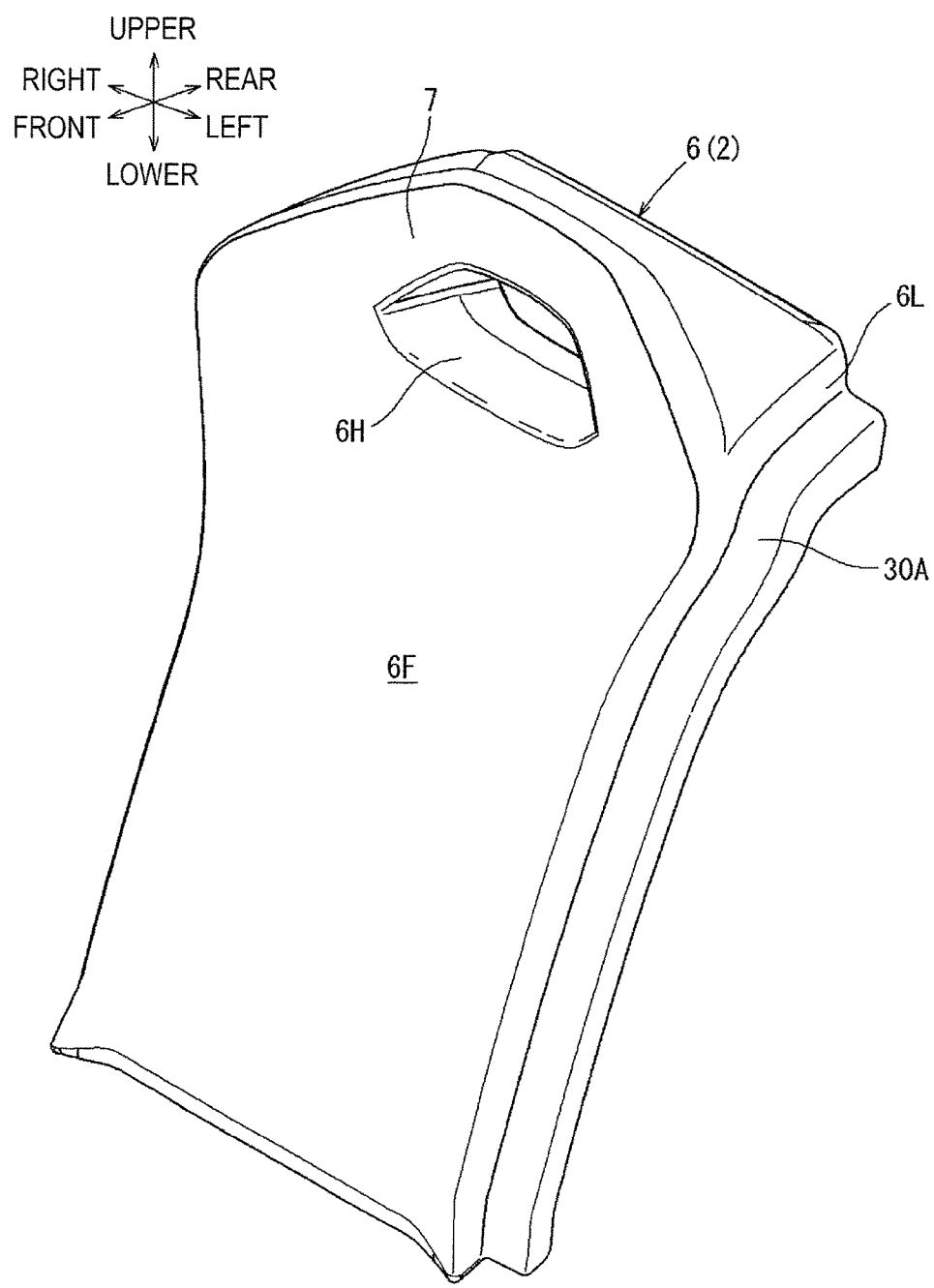
FIG. 9 is a schematic perspective view of a first structure according to a modification.

By referring to FIGS. 1, 5 and 8, the first structure 6 includes a seat pad 6P elastically supporting an occupant, a seat cover 6S covering the seat pad 6P, and a seat frame (W1 to W7) forming a framework. Here, the seat pad 6P is a member having a substantially rectangular shape in a front view and forming an outer shape of the seat. The seat pad 6P can be formed of, for example, a foamed resin such as polyurethane foam (density: 10 kg/m$^3$ to 60 kg/m$^3$). Further, the seat cover 6S is a surface member capable of covering the surface of the seat pad 6P. The seat cover 6S can be formed of, for example, fabric (woven fabric, knitted fabric or non-woven fabric) or leather (natural leather or synthetic leather). Meanwhile, by referring to FIG. 8, in the present embodiment, a left end of the seat cover 6S is sewn to a right end of a skin (not numbered) covering the second structure 8 to be described later.

Further, by referring to FIG. 5, the seat frame is configured by a plurality of wire members (first wire member W1 to seventh wire member W7) to be described later and includes an upper fixing bracket 21 and a pair of left and right fixing brackets 22R, 22L. In the present embodiment, the respective wire members W1 to W7 are integrated, in an embedded form, with the seat pad 6P shown in FIG. 8 by a method such as an insert molding, for example. A portion of each of the fixing brackets 21, 22R, 22L is exposed to the outside from a suitable position of the seat pad 6P. Meanwhile, the materials of the respective wire members W1 to W7 and the respective fixing brackets 21, 22R, 22L are not particularly limited so long as the strength suitable for the seat frame can be secured. However, typically, a metal having excellent rigidity, such as steel, can be adopted.

By referring to FIG. 5, the upper fixing bracket 21 is a member fastened and fixed to the first panel part 51 on the rear side. The upper fixing bracket 21 is disposed at the center of the upper portion of the seat frame in the seat width direction. The upper fixing bracket 21 is configured by a flat-plate member having a substantially hat shape in a cross-sectional view. The upper fixing bracket 21 includes a right flange portion 21R that is a flange portion protruding to the right side and a left flange portion 21L that is a flange portion protruding to the left side. Further, the bottom surface side of the hat of the upper fixing bracket 21 is exposed to the seat pad 6P and is fastened and fixed to the first panel part 51 by a bolt member BM. Meanwhile, from the viewpoint of design, a hiding member 24 having a substantially cylindrical shape is disposed in front of the upper fixing bracket 21. The bottom side of the hole portion 6H on the upper portion of the first structure 6 is closed by the hiding member 24. Further, the pair of left and right lower fixing brackets 22R, 22L are members respectively fastened and fixed to the vehicle floor surface FL shown in FIG. 4, and are separately disposed on the left and right sides of the lower portion of the seat frame. Each of these lower fixing brackets 22R, 22L is configured by a substantially rectangular flat plate in a front view and an upper side thereof is bent in a crank shape toward the rear. Then, the lower sides of the respective lower fixing brackets 22R, 22L are exposed from the seat pad 6P and are fastened and fixed to a bracket FLB on the vehicle floor surface FL shown in FIG. 4.

Further, by referring to FIG. 5, the first wire member W1 to the seventh wire member W7 are wire members configuring the seat frame itself. The first wire member W1 and the second wire member W2 are wire members configuring an outer frame part of the seat frame. That is, the first wire member W1 configures a right side of the outer frame and the second wire member W2 configures a left side of the outer frame. The first wire member W1 and the second wire member W2 are welded and fixed to, for example, the left flange portion 21L of the upper fixing bracket 21 and the left and right lower fixing brackets 22R, 22L at appropriate positions. Further, each of the third wire member W3 and the fourth wire member W4 is a wire member extending in the upper and lower direction inside the outer frame part of the seat frame. Upper and lower ends of the third wire member W3 disposed on the right side are welded and fixed to the right flange portion 21R of the upper fixing bracket 21 and the right lower fixing bracket 22R. Further, upper and lower ends of the fourth wire member W4 disposed on the left side are welded and fixed to the left flange portion 21L of the upper fixing bracket 21 and the left lower fixing bracket 22L.

Each of the fifth wire member W5 to the seventh wire member W7 is a wire member traversing the outer frame part of the seat frame. The fifth wire member W5 is disposed in the left and right direction on the lower side of the seat frame, and left and right ends thereof are welded and fixed to the first wire member W1 and the second wire member W2. Further, the sixth wire member W6 is disposed in the left and right direction at the intermediate position of the seat frame in the upper and lower direction, and left and right ends thereof are welded and fixed to the first wire member W1 and the second wire member W2. Then, the seventh wire member W7 is disposed in the left and right direction on the upper side of the seat frame, and left and right ends thereof are welded and fixed to the first wire member W1 and the second wire member W2. The seventh wire member W7 is disposed near the shoulder portion of the first structure 6, as seen in the upper and lower direction. The falling restriction part 30 to be described later is integrated to the left side of the seventh wire member W7.

[Falling Restriction Part]

Figure 2:
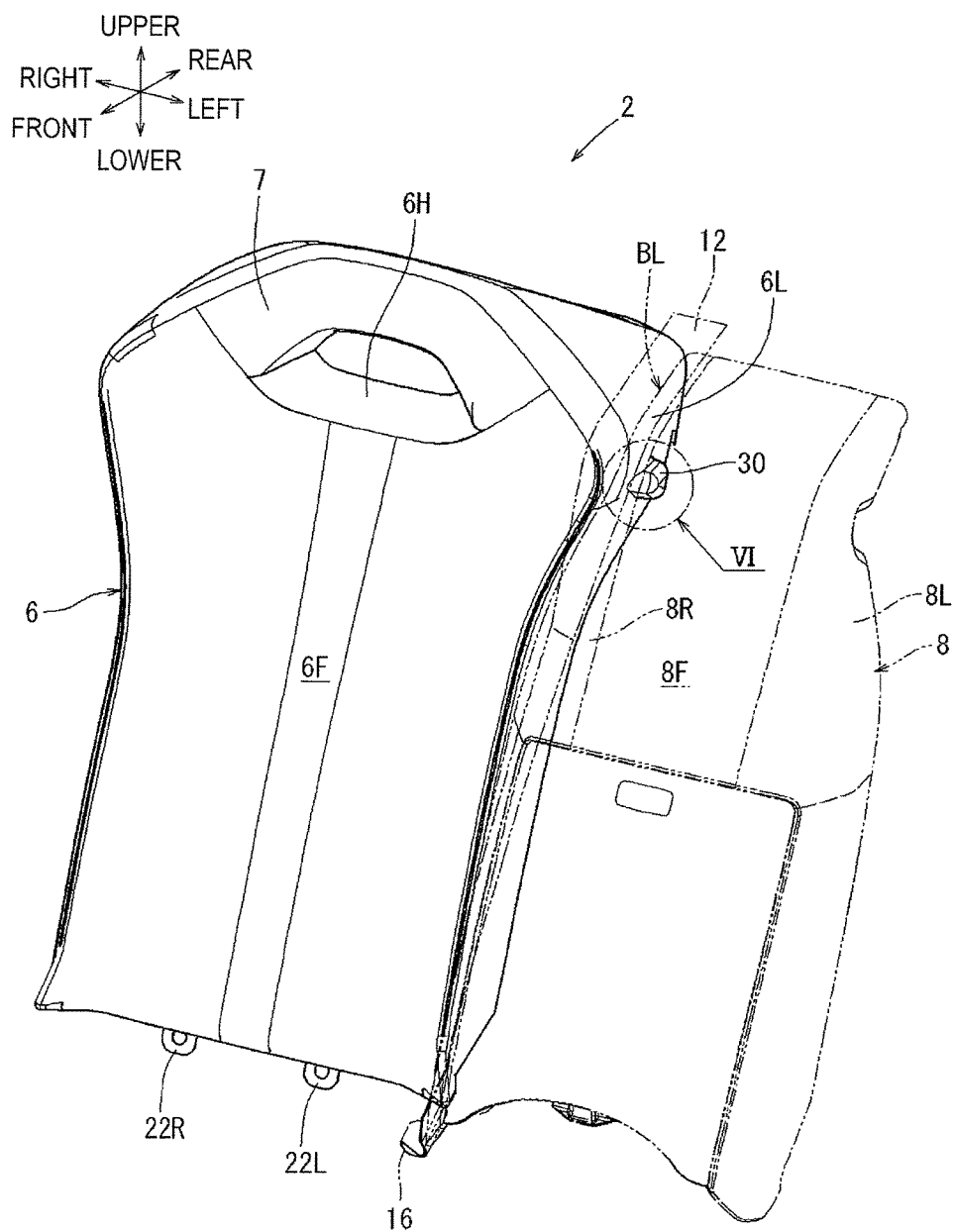
FIG. 2 is a partially transparent perspective view of the vehicle seat.

By referring to FIG. 2, the falling restriction part 30 is a member for restricting the seat belt 12 from falling into the boundary line BL that is a gap between the first structure 6 and the second structure 8. The falling restriction part 30 is a convex portion protruding toward the left side, which is a desired direction, from the left surface 6L of the first structure 6 to the right surface 8R of the second structure 8. As such, in the present embodiment, the external exposure of the falling restriction part 30 can be avoided as much as possible by providing the falling restriction part 30 on the left surface 6L of the first structure 6 different from the design surface, thereby contributing to an improvement in the appearance of the seat. Further, by referring to FIGS. 6 and 8, the falling restriction part 30 is configured by a core portion 31 and a covering portion 32. The core portion 31 is a portion forming a framework of the falling restriction part 30. In the present embodiment, the core portion 31 is configured by a portion of the seventh wire member W7 shown in FIGS. 5 and 8. That is, the core portion 31 is configured by a portion of the seventh wire member W7 protruding to the left side from the second wire member W2 and is integrated with the seat frame forming a framework of the first structure 6 (in FIGS. 5 and 8, for convenience, a portion of the seventh wire member W7 corresponding to the core portion is shown by hatching). Further, in the present embodiment, the core portion 31 linearly protrudes to the left side from the left surface 6L of the first structure 6 in the vicinity of the shoulder portion of the first structure 6 which is the arrangement position of the seventh wire member W7. Therefore, by referring to FIGS. 3 and 4, the falling restriction part 30 is provided in the vicinity of the shoulder portion of the first structure 6 and is disposed at a position closer to the arrangement position P1 of the upper end than the arrangement position P2 of the lower end of the seat belt 12.

Figure 6:
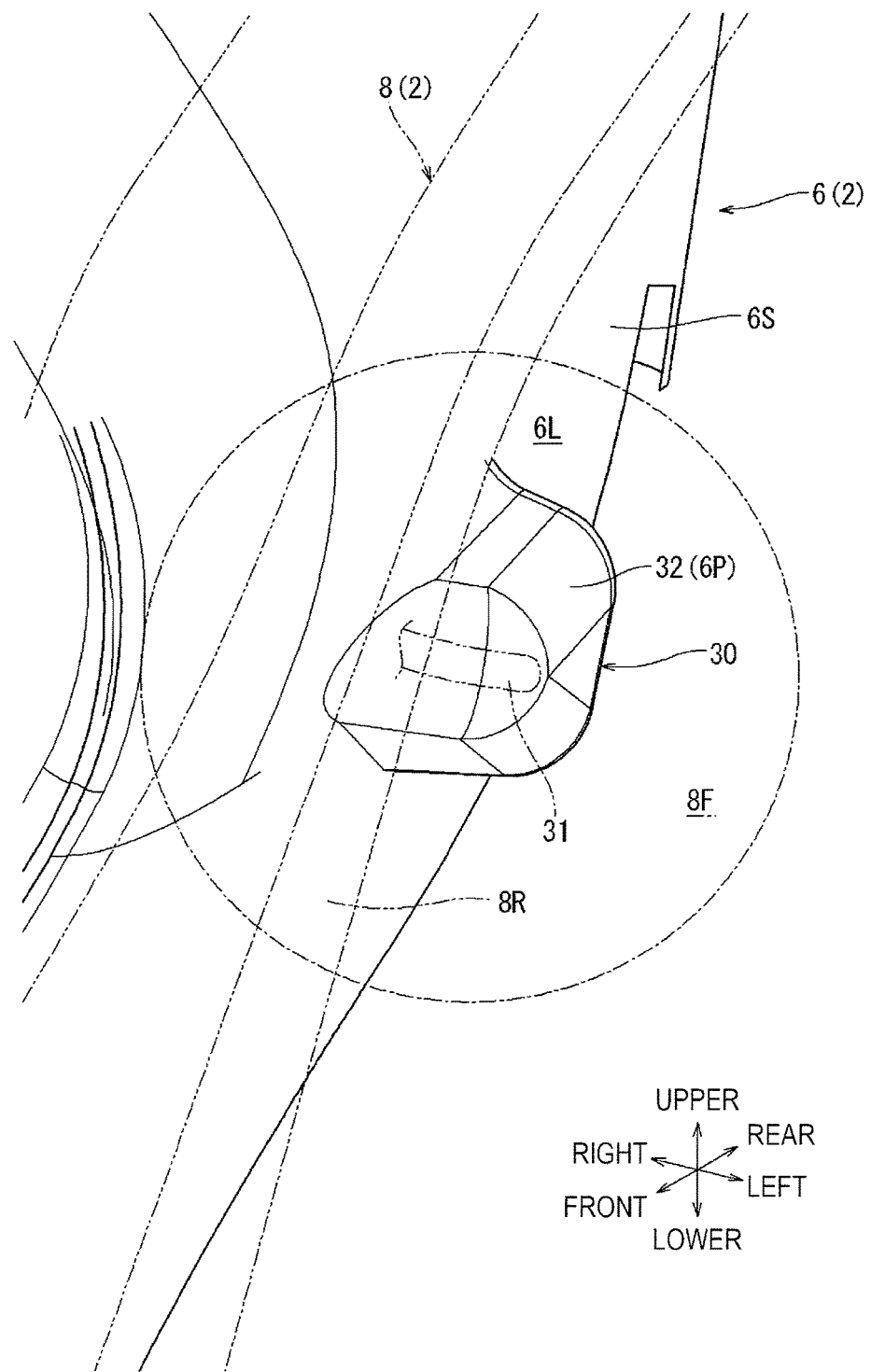
FIG. 6 is an enlarged perspective view of the first structure corresponding to the portion indicated by the circle VI in FIG. 2.

Further, by referring to FIGS. 6 and 8, the covering portion 32 is a portion forming an outer shape of the falling restriction part 30 and covers the front portion of the core portion 31. The covering portion 32 is configured by the portion of the seat pad 6P protruding from the left surface of the seat pad 6P. Similar to the seat pad 6P, the covering portion 32 is made of a foamed resin such as polyurethane foam and is a relatively soft portion. Furthermore, the surface of the covering portion 32 has no conspicuous convex portion and is smoother than that of the core portion 31. Therefore, even when the seat belt 12 contacts the covering portion 32, the seat belt 12 is not damaged as much as possible. Meanwhile, the fact that the surface of the covering portion 32 is smooth means that there is relatively little resistance to impede the movement of the seat belt 12 when the seat belt 12 moves to the contact state. Therefore, even when the surface of the covering portion 32 has irregularities, it can be said that the surface of the covering portion 32 is smooth when the convex portion is soft and its resistance is small.

[Second Structure]

Figure 7:
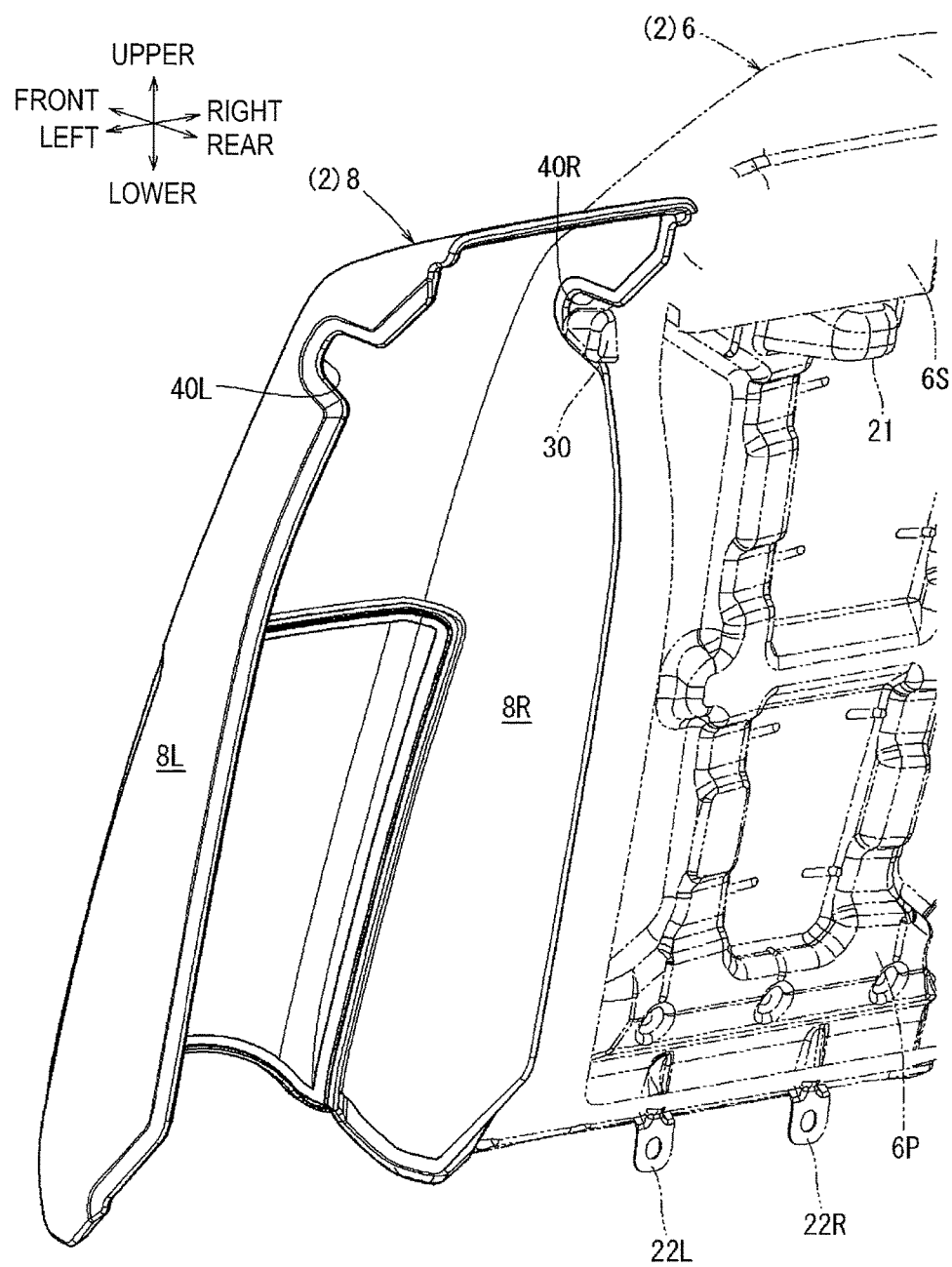
FIG. 7 is a perspective view of a second structure, as seen from the back side.

By referring to FIGS. 1 and 7, the second structure 8 is configured by a rectangular parallelepiped hollow member that is elongated in the upper and lower direction in the standing posture. The rear side of the second member 8 is opened. An insertion portion 40R through which the falling restriction part 30 can be inserted is provided to the right surface 8R of the second structure 8. The insertion portion 40R is a semicircular hole portion opened on the rear side and can be formed by cutting out the rear edge of the right surface 8R in a substantially semicircular shape. Then, by referring to FIG. 7, the falling restriction part 30 protruding from the first structure 6 enters the inside of the second structure 8 through the insertion portion 40R of the right surface 8R. In this way, by referring to FIG. 3, the falling restriction part 30 is arranged between the first structure 6 and the second structure 8 without a gap. Meanwhile, assuming that a falling restriction part is provided in the third structure 10, another insertion portion 40L is also formed on the left surface 8L of the second structure 8. Meanwhile, when disposing the second structure 8 between the first structure 6 and the third structure 10, the second structure 8 is fitted, from the front, into the space between the first structure 6 and the third structure 10 in the standing state. With such fitting operation of the second structure 8, the falling restriction part 30 is gradually fitted from the rear of the insertion portion 40R.

[Restriction of Movement of Seat Belt by Falling Restriction Part]

Figure 3:
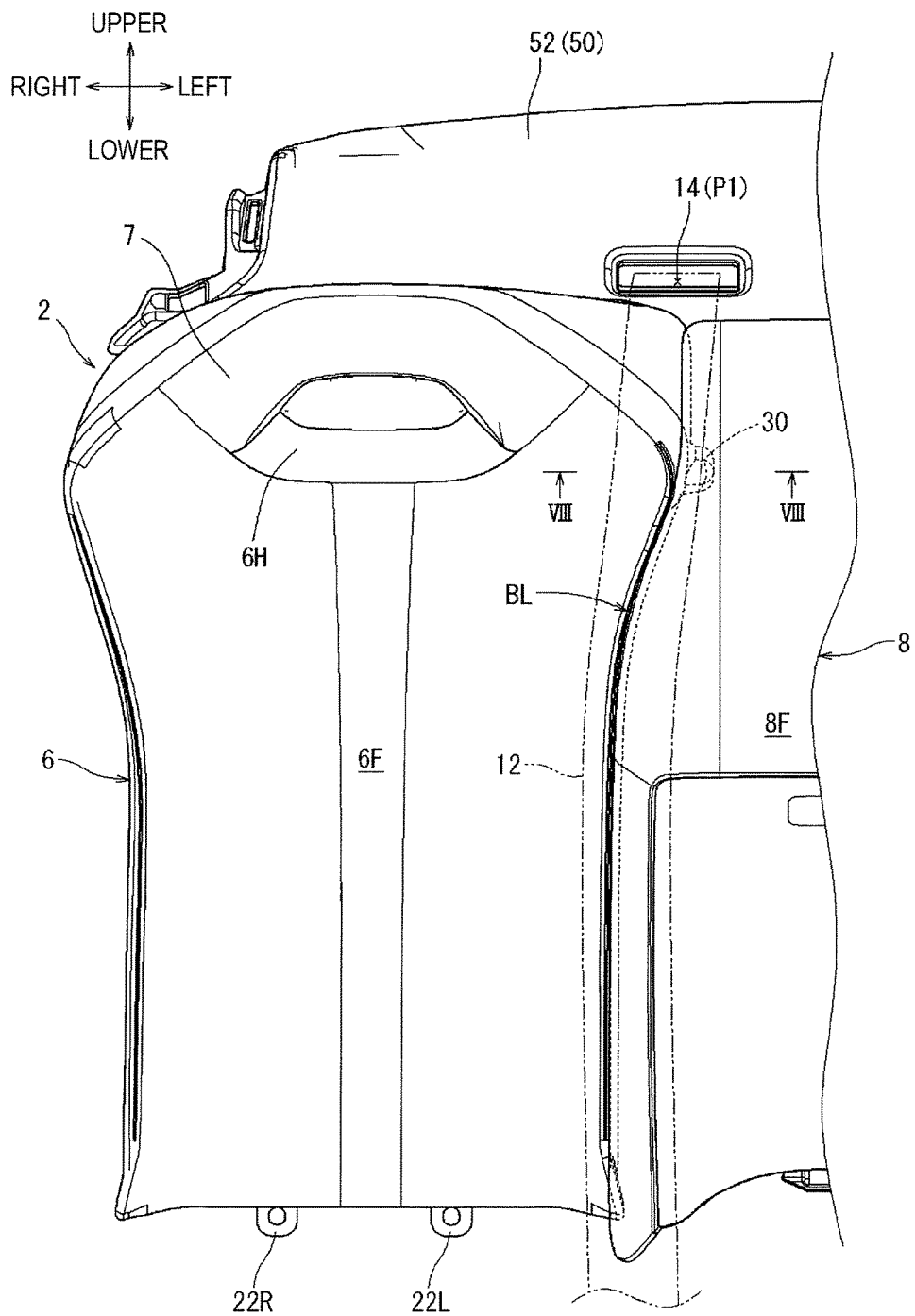
FIG. 3 is a front view of a part of the vehicle seat.

By referring to FIGS. 3 and 4, when an occupant is not seated, the seat belt 12 is wound up into the outlet 14 on the upper side and thus is linearly arranged in the upper and lower direction of the seat. At this time, the seat belt 12 is in a state where a tension is applied to the rear side. In particular, the tension is strongly applied to the upper end side of the seat belt 12. In this type of configuration, there is a concern that the seat belt 12 excessively falls into the boundary line BL serving as the gap between the first structure 6 and the second structure 8. Therefore, in the present embodiment, the falling restriction part 30 provided in the first structure 6 restricts the movement of the seat belt 12 falling into the boundary line BL serving as the gap between the first structure 6 and the second structure 8.

That is, by referring to FIG. 8, when the seat belt 12 moves rearward and falls into the boundary line BL, the seat belt 12 comes into contact with the falling restriction part 30 extending in the left and right direction within the boundary line BL. Therefore, the movement of the seat belt 12 toward the rear side (which is a falling direction) is restricted by the falling restriction part 30. As a result, the excessive falling of the seat belt 12 into the boundary line BL is avoided. Particularly, in the present embodiment, the excessive falling of the portion of the seat belt 12 to which a relatively strong tension is applied can be appropriately avoided by the falling restriction part 30 provided in the vicinity of the shoulder portion of the first structure 6. Further, the core portion 31 of the falling restriction part 30 is firmly integrated with the seventh wire member W7. Therefore, the seat belt 12 trying to fall into the boundary line BL can be suitably supported by the falling restriction part 30, so that the excessive falling of the seat belt 12 can be more stably avoided. Furthermore, in the falling restriction part 30, the relatively smooth and soft covering portion 32 is in contact with the seat belt 12. Therefore, the breakage of the seat belt 12 caused by the contact with the falling restriction part 30 can be more suitably avoided.

In the present embodiment as described above, the unintended movement of the seat belt 12 toward the rear side is restricted by the falling restriction part 30. Therefore, it is possible to avoid the excessive falling of the seat belt 12 into the boundary line BL that is the gap between the first structure 6 and the second structure 8 as much as possible. In particular, since the falling restriction part 30 is disposed in the first structure 6 serving as a seat back, it is possible to avoid the excessive falling of the seat belt 12 as much as possible. At this time, the falling restriction part 30 is provided to the left surface 6L of the first structure 6 which is a portion different from the design surface, and thus, is not exposed to the outside as much as possible, thereby achieving a good appearance. Further, since the falling restriction part 30 is provided at a position different from the design surface, it is possible to increase the degree of freedom of design on the design surface side. Further, since the falling restriction part 30 protrudes to the left side that is a desired direction, it is possible to more suitably prevent the seat belt 12 from excessively falling into the gap between the first structure 6 and the second structure 8. Particularly, since the falling restriction part 30 is disposed between the first structure 6 and the second structure 8 without a gap, the excessive falling of the seat belt 12 can be more reliably avoided. Therefore, according to the present embodiment, it is possible to avoid the excessive falling of the seat belt 12 into the boundary line BL that is the gap between the first structure 6 and the second structure 8 as much as possible.

Furthermore, in the present embodiment, the support performance of the falling restriction part 30 can be improved by the core portion 31 firmly integrated with the seventh wire member W7. Thus, the excessive falling of the seat belt 12 can be more stably avoided. Also, the breakage of the seat belt 12 caused by the contact with the falling restriction part 30 can be avoided as much as possible by the covering portion 32 whose surface is relatively smooth. Especially, the breakage of the seat belt 12 caused by the contact with the falling restriction part 30 can be more reliably avoided by the covering portion 32 made of a foamed resin and having moderate softness.

Further, in the present embodiment, a strong tension is applied to the vicinity of an upper end of the seat belt 12, and hence, the seat belt 12 is liable to fall into the gap between the first structure 6 and the second structure 8. Therefore, the falling restriction part 30 is disposed in the vicinity of the upper end of the seat belt 12, and thus, the portion of the seat belt 12 to which a relatively strong tension is applied can be suitably prevented from excessively falling.

[Modification]

Here, the falling restriction part may have various configurations, in addition to the above-described configurations. For example, by referring to FIG. 9, a falling restriction part 30A of the present modification is formed over substantially the entire length of the left surface 6L of the first structure 6 and is provided continuously on the upper and lower direction of the seat. When the falling restriction part 30A is formed over substantially the entire length of the left surface 6L in this way, the falling of the seat belt can be appropriately prevented. Meanwhile, in the modification, a covering portion of the falling restriction part 30A is provided continuously in the upper and lower direction of the seat. However, the core portion can be also provided continuously in the upper and lower direction of the seat. For example, by referring to FIG. 5, the left end of the seventh wire member W7 extends downward, so that the core portion of the falling restriction part 30A can be provided continuously in the upper and lower direction of the seat. Further, the core portion may be provided intermittently in the upper and lower direction of the seat. In this case, by referring to FIG. 5, the respective left ends of the fifth wire member W5, the sixth wire member W6 and the seventh wire member W7 protrude to the left side, so that three core portions configured by the left ends of the respective wire members can be provided intermittently in the upper and lower direction of the seat.

The vehicle interior structure of the present embodiment is not limited to the above-described embodiments, but can take various other embodiments. In the present embodiment, the configurations (shape, size, arrangement position and arrangement number, etc.) of the falling restriction part 30 are exemplified, but these are not intended to limit the configurations of the falling restriction part. For example, the falling restriction part can be provided to at least one of the first structure and the second structure. Further, a single or a plurality of falling restriction parts may be provided at appropriate positions on the left surface of the first structure, for example. Further, the falling restriction part may be configured by either the core portion or the covering portion. Further, the core portion may be configured by the seat frame itself (i.e., the seat frame itself may function as the core portion) as in the present embodiment or may be retrofitted and integrated with the seat frame. Further, the covering portion may be configured by the seat pad itself (i.e., the seat pad itself may function as the covering portion), or may be retrofitted to the seat pad, or may be configured by a member separate from the seat pad.

Further, in the present embodiment, the configurations (shape, size, arrangement position, function, etc.) of the first structure 6 and the second structure 8 are exemplified, but these are not intended to limit the configurations of these structures. For example, the second structure may be used as a member for partitioning the first structure and the third structure which are not intended for use as a seat back and may be used as a seat back. As the first structure and the second structure, it is possible to assume various members arranged adjacently in the vehicle interior. For example, a seat component such as a seat back or a seat cushion, a console box, a door, an instrument panel or a tire house can be exemplified as each structure. Further, similarly, various members other than the seat belt, for example, a member assumed to fall into the gap between the first structure and the second structure can be exemplified as another member. In addition, the configuration of the present embodiment can be generally applied to the interior structure of a vehicle such as an automobile, an aircraft or a train.

The disclosure provides illustrative, non-limiting examples as follows:

According to a first aspect, there is provided a vehicle interior structure including: a first structure; a second structure disposed adjacent to the first structure; and another member disposed on a design surface side of at least one of the first structure and the second structure, wherein a falling restriction part configured to restrict the other member from falling into a gap between the first structure and the second structure is provided to at least one of the first structure and the second structure.

Accordingly, the unintended movement of the other member is restricted by the falling restriction part. Therefore, it is possible to prevent the other member from excessively falling into the gap between the first structure and the second structure as much as possible.

According to a second aspect, there is provided the vehicle interior structure according to the first aspect, wherein a first surface different from a design surface of the first structure and a second surface different from a design surface of the second structure are arranged to face each other in a state where the first structure and the second structure are arranged adjacent to each other, and wherein the falling restriction part is provided to the first surface and protrudes toward the second surface.

Accordingly, the falling restriction part is provided at a position different from the design surface, thereby achieving a good appearance. Further, since the falling restriction part protrudes in a desired direction, it is possible to more suitably prevent the other member from excessively falling into the gap between the first structure and the second structure.

According to a third aspect, there is provided the vehicle interior structure according to the second aspect, wherein the falling restriction part enters into the second structure through an insertion portion of the second surface.

Accordingly, the falling restriction part is disposed between the first structure and the second structure without a gap. Therefore, the excessive falling of the other member can be more reliably avoided.

According to a fourth aspect, there is provided the vehicle interior structure according to the third aspect, wherein the vehicle interior structure includes a vehicle seat and the first structure includes a seat back configured to support an occupant's back, and wherein the falling restriction part is provided to the first structure and the insertion portion is provided to the second structure.

Accordingly, the falling restriction part is provided to the first structure serving as a seat back. Therefore, the excessive falling of the other member can be more reliably avoided.

According to a fifth aspect, there is provided the vehicle interior structure according to any one of the first to fourth aspects, wherein the other member includes a band-like member to which a tension is applied in a falling direction of the other member.

Accordingly, even when a tension is applied to the other member, the falling restriction part can prevent the other member from excessively falling into the gap between the first structure and the second structure as much as possible.

According to a sixth aspect, there is provided the vehicle interior structure according to the fifth aspect, wherein the tension applied to the other member in the falling direction of the other member gradually increases from one end side toward another end side of the other member, and wherein the falling restriction part is disposed at a position closer to an arrangement position of the other end than an arrangement position of the one end of the other member.

Accordingly, a strong tension is applied to the vicinity of the other end of the other member, and hence, the other member is liable to fall into the gap between the first structure and the second structure. Therefore, the falling restriction part is disposed in the vicinity of the other end of the other member, and thus, the portion of the other member to which a relatively strong tension is applied can be suitably prevented from excessively falling.

According to a seventh aspect, there is provided the vehicle interior structure according to any one of the first to sixth aspects, wherein the falling restriction part includes a core portion integrated with a frame forming a framework of at least one of the first structure and the second structure.

Accordingly, the support performance of the falling restriction part is improved by the core portion firmly integrated with the frame. Thus, the excessive falling of the other member can be more stably avoided.

According to an eighth aspect, there is provided the vehicle interior structure according to the seventh aspect, wherein the falling restriction part includes a covering part whose surface is smoother than the core portion, and the covering portion covers a portion of the core portion which is in contact with the other member.

Accordingly, the breakage of the other member caused by the contact with the falling restriction part can be avoided as much as possible by the covering portion whose surface is relatively smooth.

According to a ninth aspect, there is provided the vehicle interior structure according to the eighth aspect, wherein the covering portion is made of a foamed resin.

Accordingly, the breakage of the other member caused by the contact with the falling restriction part can be more reliably avoided by the covering portion made of a foamed resin and having moderate softness.

According to the first aspect of the disclosure, it is possible to prevent the other member from excessively falling into the gap between the first structure and the second structure as much as possible. Further, according to the second aspect, the excessive falling of the other member can be more suitably avoided. Further, according to the third aspect, the excessive falling of the other member can be more reliably avoided. Further, according to the fourth aspect, it is possible to prevent the other member from excessively falling into the gap between the first structure and the second structure as the seat back as much as possible. Further, according to the fifth aspect, the excessive falling of the other member tensioned can be avoided as much as possible. Further, according to the sixth aspect, the portion of the other member to which a relatively strong tension is applied can be suitably prevented from excessively falling. Further, according to the seventh aspect, the excessive falling of the other member can be more stably avoided. Further, according to the eighth aspect, it is possible to avoid the breakage of the other member caused by the contact with the falling restriction part as much as possible while more stably avoiding the excessive falling of the other member. Then, according to the ninth aspect, the breakage of the other member caused by the contact with the falling restriction part can be more reliably avoided.

What is claimed is:

1. A vehicle interior structure comprising:
a first structure;
a second structure disposed adjacent to the first structure; and
another member disposed on an exterior side of a design surface of at least one of the first structure and the second structure,
wherein a falling restriction part configured to restrict the another member from falling into a gap between the first structure and the second structure is provided to at least one of the first structure and the second structure,
wherein a first surface of the first structure, which is different from the design surface of the at least one of the first structure and the second structure, and a second surface of the second structure, which is different from the design surface of the at least one of the first structure and the second structure, are arranged to face each other in a state where the first structure and the second structure are arranged adjacent to each other,
wherein the falling restriction part is provided to the first surface and protrudes toward the second surface, and
wherein the falling restriction part is concealed behind the design surface of the at least one of the first structure and the second structure.

2. The vehicle interior structure according to claim 1,
wherein the falling restriction part enters into the second structure through an insertion portion of the second surface.

3. The vehicle interior structure according to claim 2,
wherein the vehicle interior structure includes a vehicle seat and the first structure includes a seat back configured to support an occupant's back, and
wherein the falling restriction part is provided to the first structure and the insertion portion is provided to the second structure.

4. The vehicle interior structure according to claim 1,
wherein the another member includes a band shaped member to which a tension is applied in a falling direction of the another member.

5. The vehicle interior structure according to claim 4,
wherein the tension applied to the another member in the falling direction of the another member gradually increases from one end side toward another end side of the another member, and
wherein the falling restriction part is disposed at a position closer to an arrangement position of the other end than an arrangement position of the one end of the another member.

6. The vehicle interior structure according to claim 1,
wherein the falling restriction part includes a core portion integrated with a frame forming a framework of at least one of the first structure and the second structure.

7. The vehicle interior structure according to claim 6,
wherein the falling restriction part includes a covering part whose surface is smoother than the core portion, and the covering portion covers a front portion of the core portion.

8. The vehicle interior structure according to claim 7,
wherein the covering portion is made of a foamed resin.

* * * * *